United States Patent [19]

Conant et al.

[11] 4,452,564
[45] Jun. 5, 1984

[54] STATOR VANE ASSEMBLY AND ASSOCIATED METHODS

[75] Inventors: Ronald G. Conant; Larry T. Veasey, both of Phoenix, Ariz.

[73] Assignee: The Garrett Corporation, Los Angeles, Calif.

[21] Appl. No.: 319,829

[22] Filed: Nov. 9, 1981

[51] Int. Cl.³ .............................................. F01D 9/02
[52] U.S. Cl. ...................... 415/9; 415/137; 415/189; 415/217
[58] Field of Search .................. 415/9, 137, 189, 200, 415/216, 217

[56] References Cited

U.S. PATENT DOCUMENTS

| | | |
|---|---|---|
| 1,758,062 | 5/1930 | Replogle . |
| 1,932,278 | 10/1933 | Lacey ............................ 29/156.8 |
| 2,637,521 | 5/1953 | Constantine et al. . |
| 2,859,934 | 11/1958 | Halford et al. ................. 415/137 X |
| 2,917,276 | 12/1959 | Klompas et al. ................. 415/189 |
| 2,924,425 | 2/1960 | Cutler .............................. 415/217 |
| 2,925,998 | 2/1960 | Hayes et al. ...................... 415/137 |
| 2,980,396 | 4/1961 | Movsesian ...................... 415/189 |
| 3,001,760 | 9/1961 | Guernsey et al. . |
| 3,004,750 | 10/1961 | Broders . |
| 3,028,141 | 4/1962 | Nichols ........................... 415/137 |
| 3,075,744 | 1/1963 | Peterson ...................... 415/137 X |
| 3,266,771 | 8/1966 | Morley . |
| 3,404,831 | 10/1968 | Campbell ......................... 415/9 |
| 3,640,640 | 2/1972 | Palfreyman et al. .............. 416/2 |
| 3,708,242 | 1/1973 | Bruneau et al. .................. 415/217 |
| 3,836,282 | 9/1974 | Mandelbaum et al. ............. 415/217 |
| 4,180,371 | 12/1979 | Ivanko ........................... 415/189 X |
| 4,249,859 | 2/1981 | Benji et al. ....................... 415/79 |
| 4,268,571 | 5/1981 | McCarthy ........................ 428/236 |

FOREIGN PATENT DOCUMENTS

| | | | |
|---|---|---|---|
| 2536514 | 3/1976 | Fed. Rep. of Germany ...... | 415/217 |
| 689216 | 3/1953 | United Kingdom ............... | 415/137 |
| 732920 | 6/1955 | United Kingdom ............... | 415/217 |
| 748912 | 5/1956 | United Kingdom ............... | 416/218 |
| 758106 | 9/1956 | United Kingdom ............... | 415/137 |
| 789733 | 1/1958 | United Kingdom ............... | 415/217 |

Primary Examiner—Everette A. Powell, Jr.
Attorney, Agent, or Firm—J. Richard Konneker; Albert J. Miller

[57] ABSTRACT

An annular inlet stator vane assembly positioned upstream of the bypass and core flow passages of a turbofan jet engine is provided with energy-absorbing bendable vanes which are fixedly secured to an outer support shroud assembly and extended through slots in an inner shroud assembly. The inner ends of the vanes are releasably secured to the inner shroud by specially designed deformable retention clips which are welded to the inner vane ends and shroud. These features of the vane assembly cooperate to limit the circumferential extent of inlet vane damage caused by engine-ingested objects, and to help prevent damaged vane assembly structure from being drawn through the core passage of the engine or blocking such core passage.

40 Claims, 9 Drawing Figures

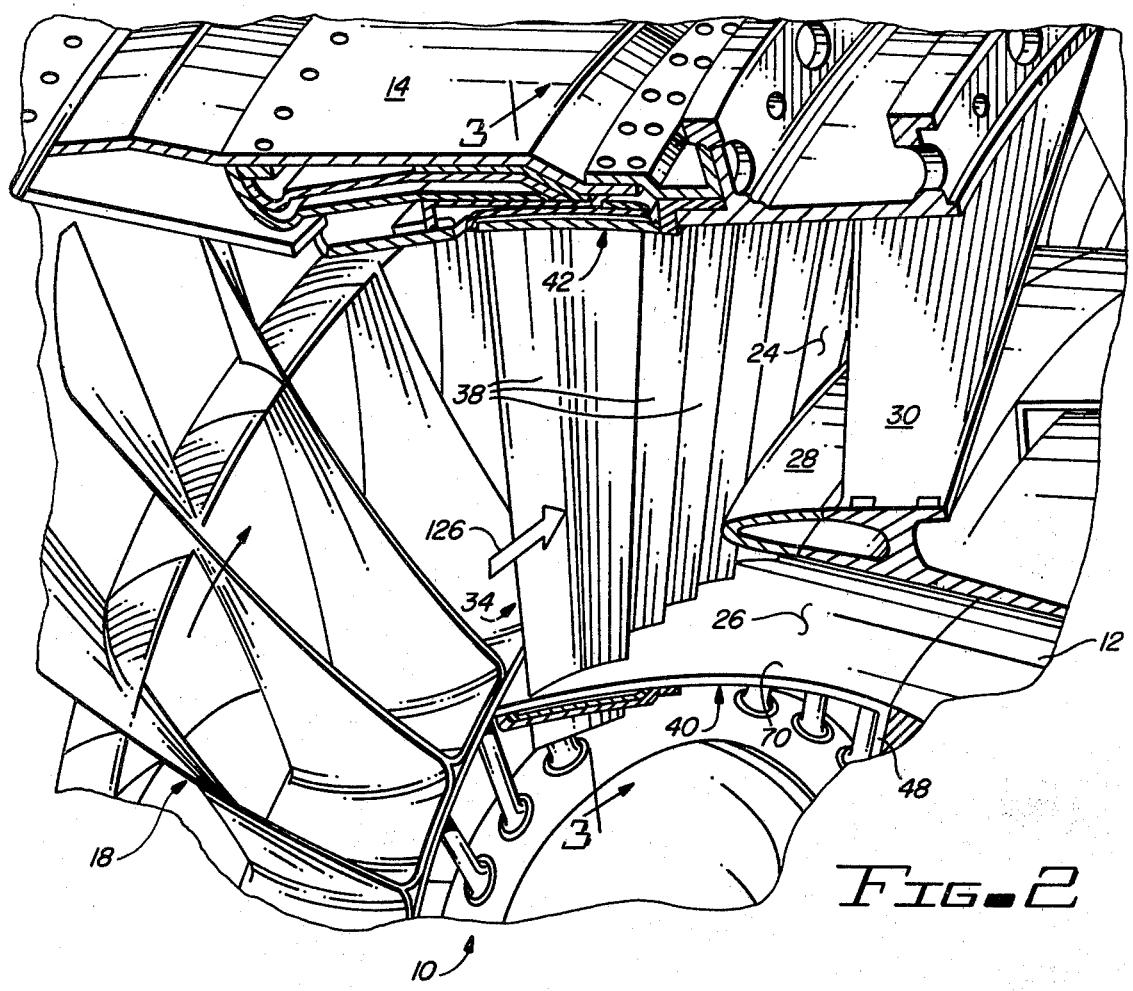
FIG-2
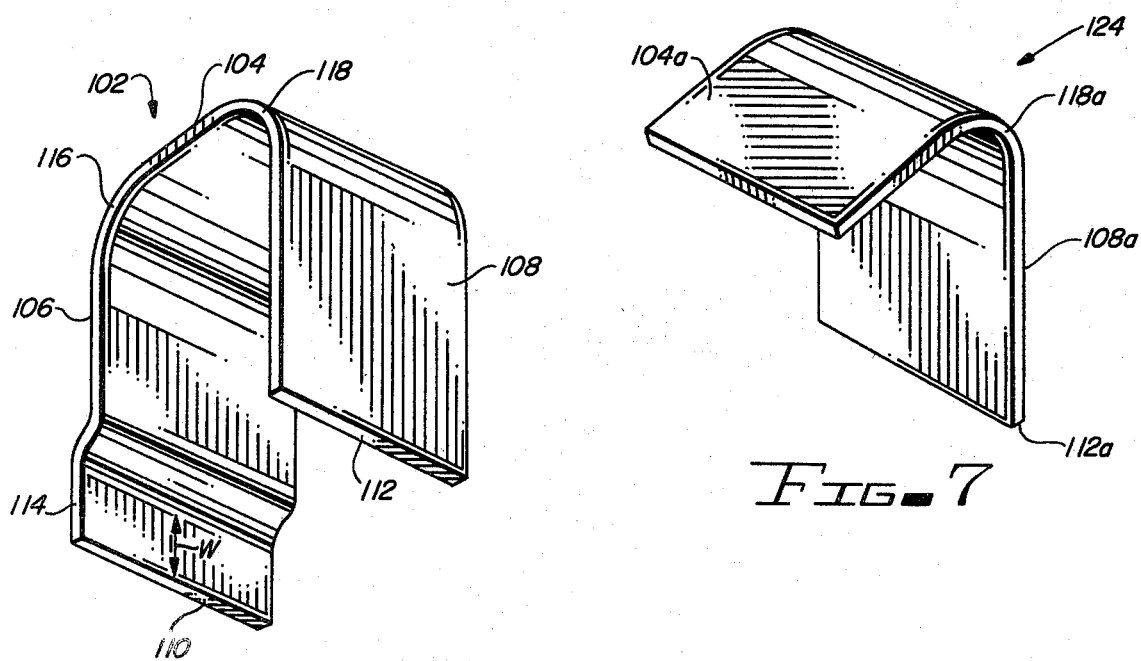
FIG-6
FIG-7

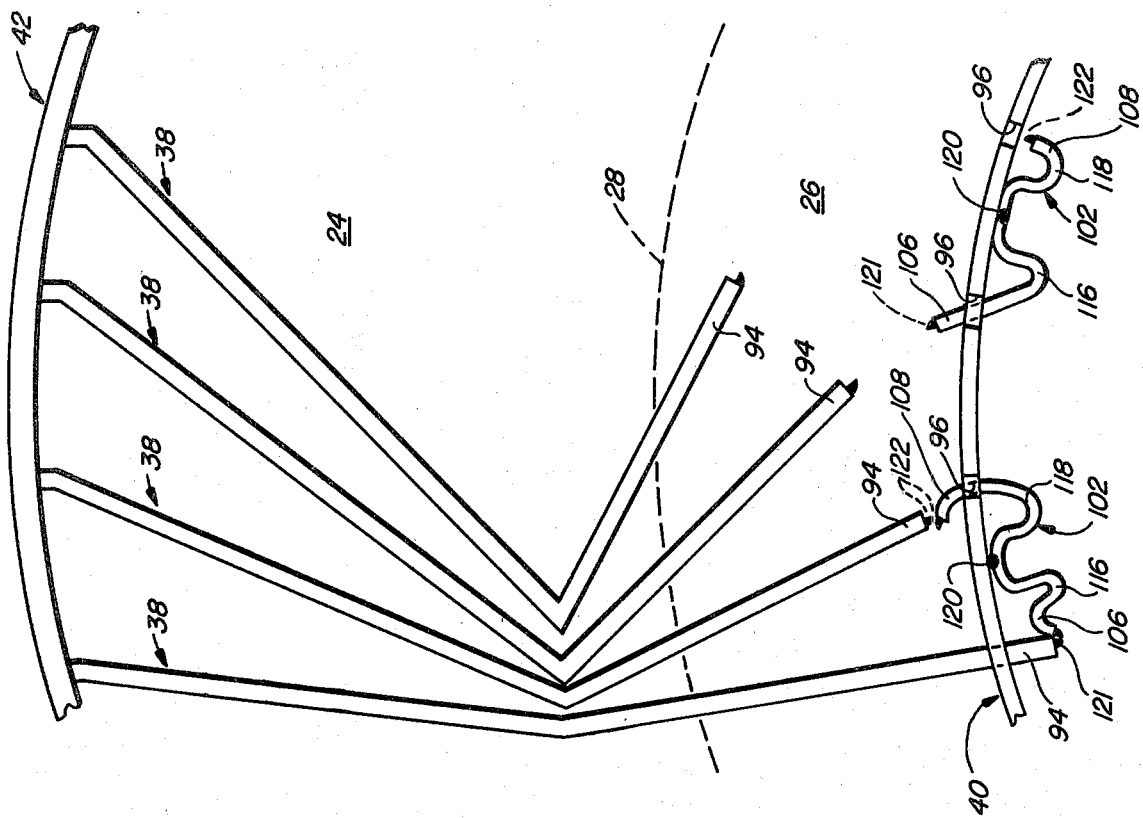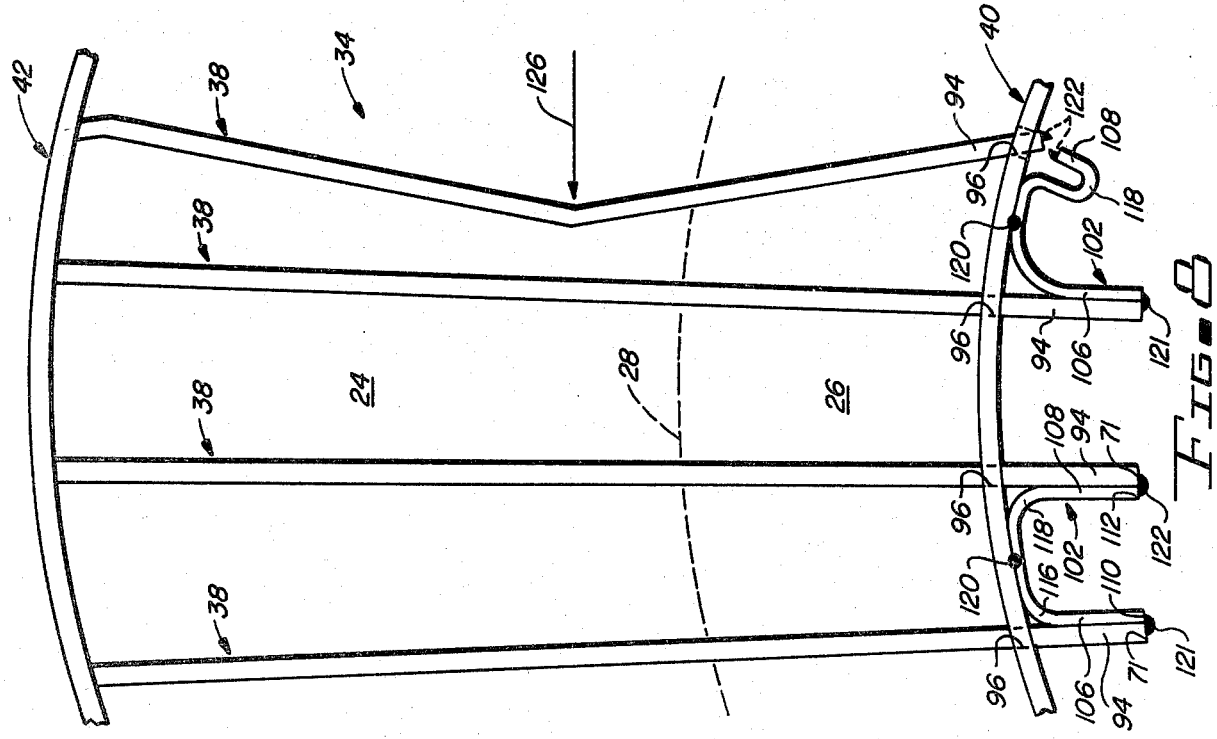

STATOR VANE ASSEMBLY AND ASSOCIATED METHODS

BACKGROUND OF THE INVENTION

The present invention relates generally to turbomachinery apparatus, and more particularly provides an improved inlet stator vane assembly for use in a turbofan jet engine.

In a typical turbofan engine a core engine is used to drive an axial flow fan which draws ambient air into a main, annular inlet passage, and forces the air through an annular stator vane assembly spanning the inlet passage. The stator vane assembly has a circumferentially spaced series of generally radially extending, airfoil-shaped vanes which are connected between annular inner and outer support shrouds. Inlet air traversing the stator vanes is flow-straightened in the usual manner and then flowed into coannular outer bypass and inner core flow passages having entrances immediately downstream of the vane assembly. Further downstream, the bypass and core flow passages respectively communicate with atmosphere and the core engine inlet.

The stator vane assembly is particularly vulnerable to damage caused by birds or other sizable objects ingested into the main inlet passage during engine operation, such objects having imparted thereto a very high tangential velocity component by the inlet fan. Damage to conventional stator vane assemblies, in turn, can adversely affect subsequent engine performance to an unacceptable degree in one or more of the three following manners.

Perhaps the most serious potential result of stator damage is the breaking away or shattering of vane or shroud structure and ingestion into the core engine of the torn away pieces. This can, of course, seriously damage the many rotating components within the core engine. Another possible form of subsequent engine power loss arising from stator assembly damage is the blockage of the core flow passage by deformed vane and/or support shroud structure. Finally, because of the high tangential velocity component of ingested objects, the potential exists for a single ingested object to cause vane damage around a considerable circumferential portion of the stator vane assembly, drastically reducing the intended flow-straightening capability of the assembly and thus also causing considerable engine power loss.

In the past, a variety of techniques have been employed in an attempt to produce a stator vane assembly which minimizes engine power loss after the vane assembly is struck by an ingested object. None of the resulting vane assemblies has proved entirely satisfactory in this regard.

One conventional stator assembly utilizes rigid solid cast metal vanes to limit vane deformation and the total circumferential extent of vane damage. However, this adds weight to the engine and also increases the chance that one or more vanes will be shattered by ingested objects and drawn into the core engine.

Another approach has been to use bendable vanes fixedly secured between the support shrouds. While this construction tends to solve the vane-shattering problem, the violent bending of the vanes often deforms the inner support shroud, causing blockage of the core flow passage. Additionally, severe bending of the impacted vanes can rip them loose from their support shrouds, sending one or more entire vanes through the core engine.

Yet another previously used vane assembly utilizes bendable vanes which are secured only to the outer support shroud, the inner ends of the vanes being simply extended through suitable openings formed in the inner support shroud so that impacted and bent vanes are merely pulled out of their inner shroud openings. The objective achieved by this design is the reduction inth first two types of engine damage or power loss—the ingestion of stator structure into the core engine and core flow passage blockage. However, it has been found that this reduction in these first two forms of damage substantially increases the third form of damage. The vanes in this type of stator assembly offer comparatively little resistance to the tangential force component of an ingested object, with the result that a single such object can readily render a very large number of vanes aerodynamically inoperable.

From the above it can be seen that there is a need for a stator vane assembly which simultaneously provides protection against each of the three above-described types of stator damage.

Accordingly, it is an object of the present invention to provide a stator vane assembly and associated methods which afford such protection and eliminate or minimize above-mentioned and other problems and disadvantages associated with conventional stator vane assemblies.

SUMMARY OF THE INVENTION

In carrying out principles of the present invention, in accordance with a preferred embodiment thereof, an improved stator vane assembly is provided which comprises a mutually spaced series of bendable stator vanes extending lengthwise between inner and outer support means. The outer ends of the vanes are fixedly secured to the outer support means, and the inner vane ends are extended through slots formed in the inner support means.

Deformable clip members are secured between the inner vane ends and the inner support means, and function to resiliently and releasably secure the vanes to the inner support means with a predetermined retention strength less than the vane retention strength at the outer support means vane connections. More specifically, the clips are fastened at spaced apart locations thereon to the inner vane ends and support means in a manner such that when a vane is subjected to a sufficient transverse force, the vane is sequentially bent, pulled out of its inner end slot while deforming its clip member, is torn free from such clip member which remains secured to the inner support means, and is moved in a direction generally transverse to the vane's original axis.

In a preferred embodiment of the invention, the assembly is annularly shaped and is used as the single span inlet stator vane array in the main inlet passage of a turbofan jet engine. The described cooperation between the bendable vanes and their deformable inner end retention members uniquely functions, in this particular application of the invention, to maintain an acceptable level of engine performance subsequent to the striking of the vane assembly by birds or other engine-ingested objects by limiting the circumferential extent of inlet vane damage and by helping to prevent damaged vane structure from being drawn through the core flow passage of the engine or blocking such core passage.

BRIEF DESCRIPTION OF THE DRAWINGS

FIG. 2 is an enlarged, partially broken away perspective view of area "2" in FIG. 1 illustrating in greater detail the vane assembly and adjacent engine structure;

FIGS. 6 and 7 are enlarged perspective views of specially designed vane retaining clips utilized in the present invention; and FIGS. 8 and 9 are simplified schematic upstream views of a portion of the stator vane assembly, and sequentially depict the damage-limiting cooperation between the vanes and retention clips thereof when one of the vanes is struck by an object ingested by the engine.

DETAILED DESCRIPTION

Figure 1:
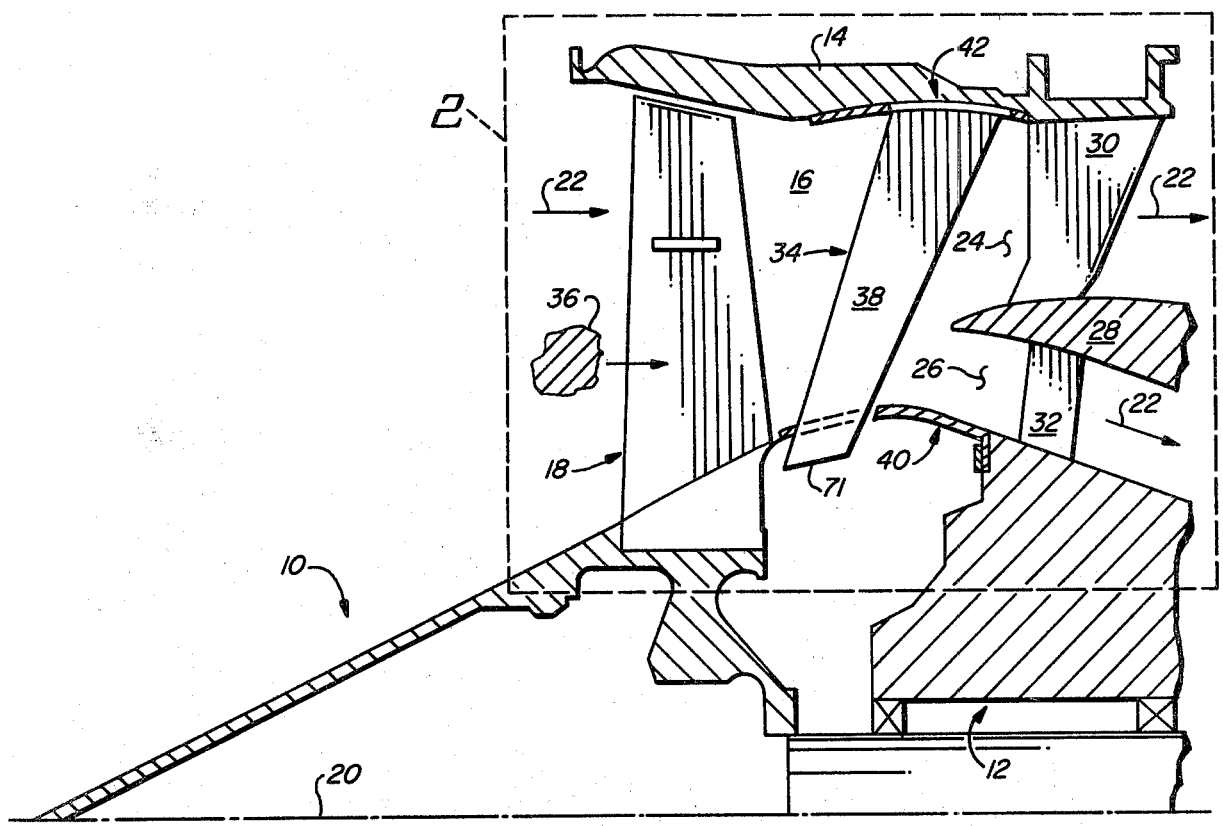
FIG. 1 is a half cross-sectional view taken through a forward portion of a turbofan jet engine having an improved inlet stator vane assembly embodying principles of the present invention.

Cross-sectionally illustrated in FIG. 1 is a forward portion of a turbofan jet engine 10 having a core portion 12 which is circumscribed by an inlet housing 14 that defines with the core portion a forwardly (i.e., leftwardly in FIG. 1) opening annular inlet passage 16. Positioned in the inlet passage 16 adjacent its open left end is an axial flow inlet fan assembly 18 which, during operation of the engine, is rotationally driven about the engine center line 20 by a core engine section (not shown) of the turbofan engine 10. Rotation of the inlet fan 18 draws ambient air 22 into the inlet passage 16 and forces it into coannular outer bypass and inner core flow passages 24, 26 positioned downstream of fan 18 and communicating at their entrances with inlet passage 16. These annular passages 24, 26 are defined by an annular splitter member 28 which is supported between the core structure 12 and the inlet housing 14 by mutually spaced series of outer support struts 30 and inner support struts 32. Air forced into the bypass passage 24 is discharged to atmosphere, while air forced into the core flow passage 26 flows into the inlet of the core engine which drives inlet fan 18.

Interposed between the inlet fan 18 and the entrances to the flow passages 24, 26, and extending completely across the inlet passage 16, is an annular inlet stator vane assembly 34 which embodies principles of the present invention. As will be seen, the vane assembly 34 uniquely provides substantial structural and operational improvements over conventional stator vane assemblies, relative to limiting potential engine power loss caused by the ingestion into the inlet passage 16 of birds or other objects 36 which strike and damage the stator structure.

Structure of Stator Vane Assembly 34

Referring to FIGS. 1 and 2, the stator vane assembly 34 comprises a circumferentially spaced series of stator vanes 38 which extend lengthwise between coannular inner and outer circular support means or shroud assemblies 40, 42 to which the opposite ends of the stator vanes are secured in a manner subsequently described. Shroud assemblies 40, 42 are suitably anchored to the core structure 12 and the inlet housing 14, respectively, and define an annular, axially extending portion of the inner surface of inlet passage 16. As can best be seen in FIG. 1, the stator vanes 38 slope forwardly across inlet passage 16 from their juncture with the outer shroud assembly 42. Each of the vanes 38 has, along its length, an airfoil-shaped cross-section so that fan inlet air forced rearwardly through the openings between adjacent stator vanes is axially flow-straightened in a conventional manner prior to its entry into the coannular passages 24, 26 immediately downstream of the stator assembly 34.

Figure 3:
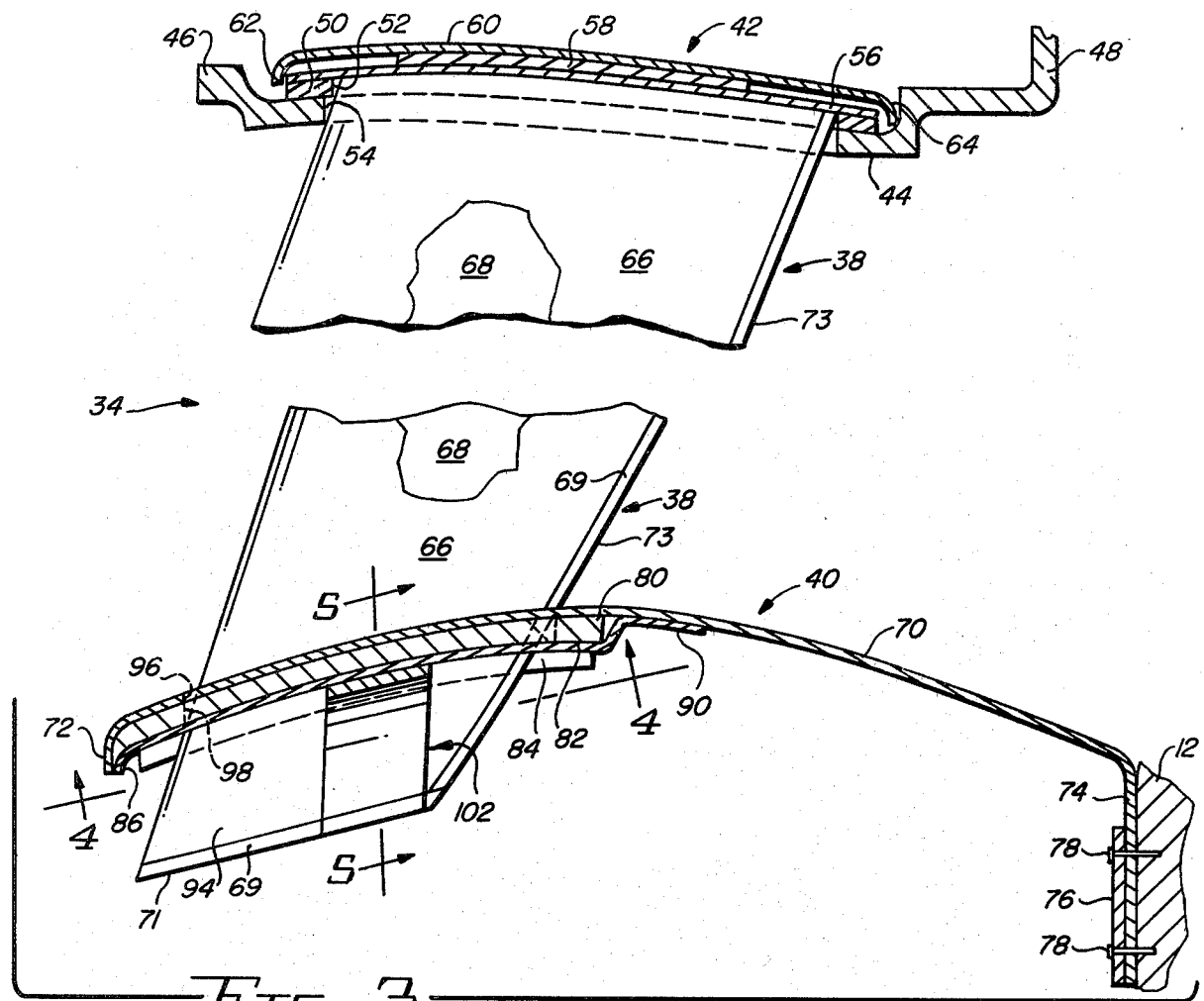
FIG. 3 is a greatly enlarged, fragmentary cross-sectional view through the stator vane assembly taken along line 3—3 in FIG. 2.

The outer shroud assembly 42, cross-sectionally depicted in FIG. 3, includes an annular metal shroud or support member 44 having suitably lipped forward and rear end portions 46, 48 which are used to anchor the shroud 44 fore and aft to the inlet housing 14. Wrapped outwardly around the shroud 44 between its opposite end portions 46, 48 is a strip 50 of resilient material such as rubber or neoprene. The stator vanes 38 are extended inwardly through aligned, circumferentially spaced slots 52, 54 formed respectively in the resilient strip 50 and the outer shroud 44, slots 54 being slightly wider than slots 52 which snugly receive the vane portions extending therethrough. Each of the vanes 38 has formed on its outer end a base portion 56 which has secured thereto a metal stiffening member 58. Base portions 56 overlie the resilient strip 50 and are substantially wider than the slots 54, thereby restraining the outer vane ends against inward movement through the shroud 44. The vanes 38 are radially clamped at their outer ends to the shroud 44, and thus essentially fixedly secured thereto, by means of an annular metal clamping band 60 which circumscribes and bears inwardly against the outer vane end stiffening members 58. At its opposite ends, the band 60 has inwardly turned lips 62, 64 which overlie the front and rear edges of the vane bases 56 and restrain the band 60 against appreciable axial movement relative to the outer shroud 44. The described outer vane end-to-shroud connection permits limited transverse movement of the vanes relative to shroud 44 so that vane vibration is absorbed by the resilient strip 50.

Each of the vanes 38 has a bendable, hollow sheet metal body 66 which is filled with a flexible, energy-absorbing and vibration-damping core material 68 such as expanded urethane foam. To retain the core material 68 within the vane bodies, one of the sidewalls of each vane body is crimped against and welded to the other sidewall, thereby creating a narrow, laterally inset area 69 which extends across the inner end edge 71 and the rear side edge 73 of the vane as indicated in FIGS. 3 and 5.

The inner shroud assembly 40 comprises an annular sheet metal shroud or support member 70 which is somewhat wider than the outer shroud 44 and is convexly curved, in a radially outward sense, around its circumference. At the front end of the shroud member 70 is a small, radially inwardly directed circumferential lip 72, while at the back end of the shroud member 70 there is formed a much wider, radially inwardly directed support flange 74 which has secured thereto an annular reinforcing ring 76. The reinforced flange 74 is secured to the core structure 12, thereby supporting the inner shroud assembly 40 in the forwardly cantilevered manner indicated in FIG. 3, by means of suitable fastening members 78.

Figure 5:
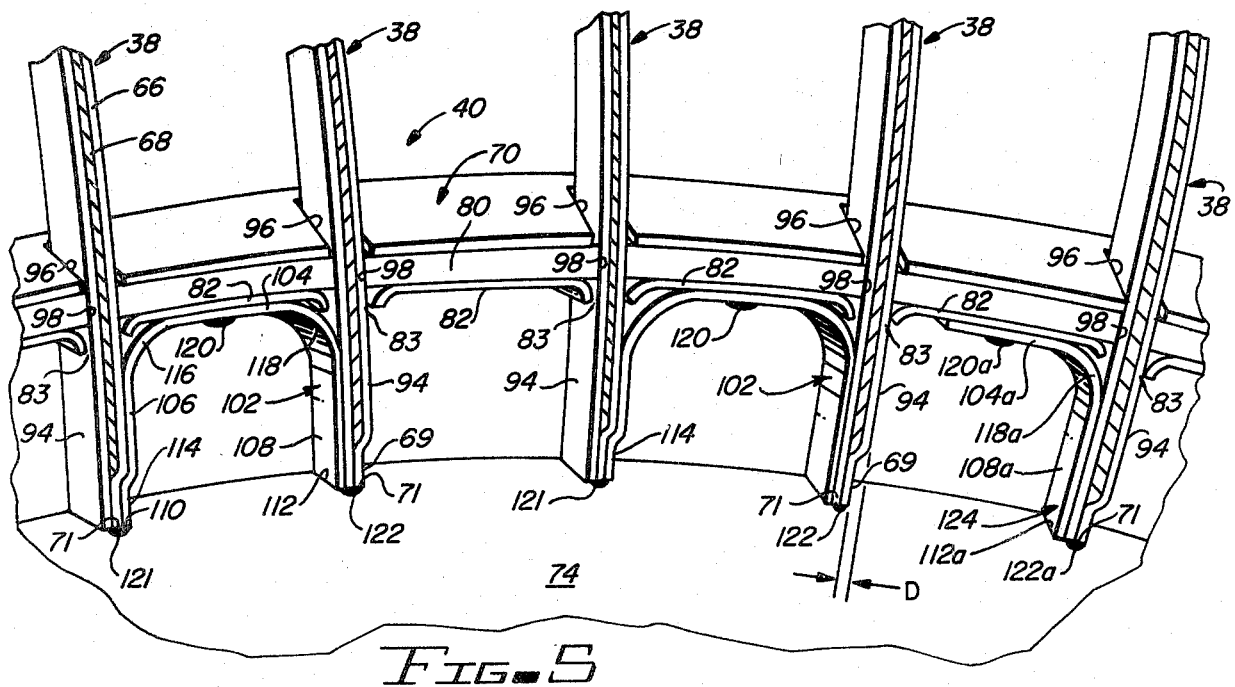
FIG. 5 is a fragmentary cross-sectional view through the stator vane assembly taken along line 5—5 of FIG. 3.
Figure 4:
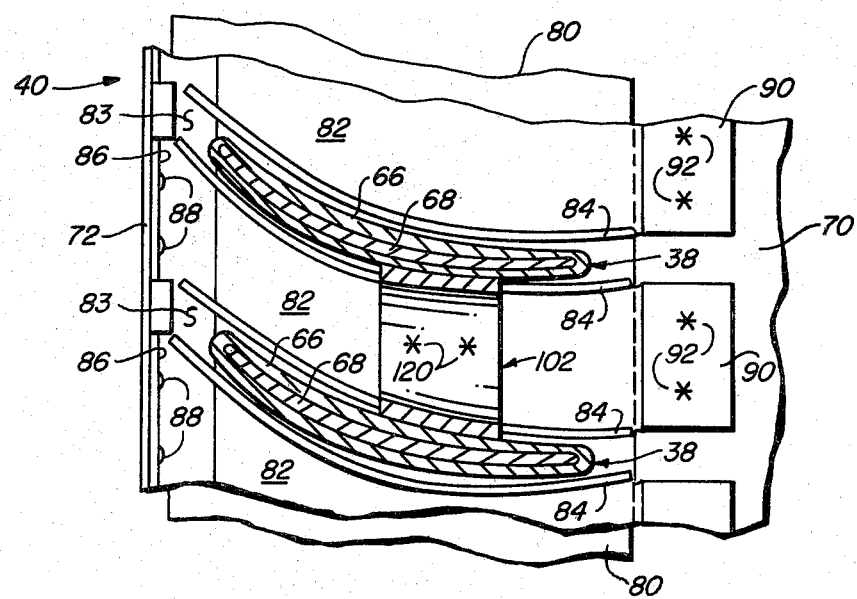
FIG. 4 is a reduced scale bottom view of the stator vane assembly, partially in plan and partially in cross-section, taken along line 4—4 of FIG. 3.

An annular strip 80 of resilient material similar to that of strip 50 is retained between a forward, radially inner surface portion of shroud member 70 and a series of elongated sheet metal fastening strips 82 (FIGS. 4 and 5). Fastening strips 82 extend lengthwise across a portion of the width of shroud 70 and are mutually laterally spaced around its circumference, thereby defining a gap 83 between each adjacent pair of strips 82. Each of the side edges of the fastening strips 82 has a longitudinal curvature substantially identical to the lateral curvature of the stator vanes 38 adjacent their inner ends, and has formed thereon along its length a radially inwardly directed stiffening flange 84. At the forward end of each fastening strip 82 is a small, radially inwardly directed attachment lip 86 which is secured by spot welds 88 to the forward shroud lip 72. A back end portion 90 of each fastening strip 82 is laterally offset toward the shroud member 70 and secured to its inner surface by spot welds 92.

To connect the vanes 38 to the inner shroud assembly 40, inner end portions 94 of the vanes are inserted inwardly through appropriately curved, aligned slots 96, 98 which are respectively formed in shroud member 70 and resilient strip 80 and positioned directly over each of the curved gaps 83 between adjacent pairs of the stiffening flanges 84. Slots 96 are slightly longer and wider than the cross-sections of the vane portions which extend therethrough, while slots 98 are sized to snugly receive such vane portions (see FIG. 5).

The inner end portions 94 of the inserted vanes extend inwardly through the gaps 83 (which are slightly wider than the inserted vane portions) with the inner end edges 71 of the vanes positioned radially inwardly of the stiffening flanges 84 as shown in FIG. 3. The relative sizing of the slots 96, 98 and the gaps 83 permits limited transverse movement of the inner vane end portions 94 between the adjacent pairs of stiffening flanges 84 and the side surfaces of slots 96. Such transverse vane movement is resiliently resisted by the strip 80 which functions, in a manner similar to that of the outer resilient strip 50, to absorb vane vibration.

Stator vanes 38 are resiliently and releasably restrained against radially outward removal or dislodgement from the inner shroud assembly 40, with a predetermined radial retention force significantly less than that of the previously described outer vane end connection structure, by means of specially designed, generally U-shaped retainer clips 102, one of which is perspectively illustrated in FIG. 6.

Each retainer clip 102 is formed from a strip of sheet metal and has a base portion 104. A pair of mutually spaced leg portions 106, 108 extend generally perpendicularly to the base portion in the same direction from its opposite ends, the legs 106, 108 having outer end edges 110, 112 respectively. An outer end portion 114 of leg 106 is offset laterally outwardly from the balance of leg 106 a distance equal to the inset depth D of the crimped vane area 69 (see FIG. 5) extending along the inner end edge 71 of each vane 38, and has a width W equal to the width of such crimped area. Legs 106, 108 are respectively joined to the clip base 104 by outwardly curved clip portions 116, 118, respectively, each of these joining portions having a relatively large radius of curvature. The distance between the outer side surfaces of legs 106, 108 is substantially equal to the distance between the opposed outer side surfaces of adjacent pairs of inner vane end portions 94. Additionally, the outer end edges 110, 112 of the clip legs are each spaced apart from the outer side surface of the clip base 104 a distance equal to the distance by which the inner vane ends 71 project radially inwardly of the fastening strips 82.

Referring now to FIGS. 3-5, the retainer clips 102 are positioned between alternate adjacent pairs of the projecting inner vane end portions 94, approximately midway between the front and rear side edges thereof, so that the clip leg outer side surfaces abut the opposing outer side surfaces of the vane pairs, the clip bases 104 abut the fastening strips 82 between the vane pairs, and the offset clip leg portions 114 are received in the inset areas 69 of one of the inner end edges 71 in each vane pair. With the clips 102 positioned in this manner, each of the clip leg end edges 110, 112 is aligned with one of the inner end edges 71 in the vane pairs as can best be seen in FIG. 5.

Each of the clips 102 is anchored to the inner shroud assembly 40 by means of spot welds 120 between the clip base 104 and the abutting fastening strip 82, an edge weld 121 extending along the aligned vane and clip leg edges 71, 110, and an edge weld 122 extending along the aligned vane and clip leg edges 71, 112.

In the event that there are an uneven number of vanes 38 in the stator assembly 34, an L-shaped half-clip 124 (FIG. 7) is used to resiliently and releasably secure the odd vane to the inner shroud assembly 40, as indicated in FIG. 5, in the same manner as the full or U-shaped clips 102. Clip 124 is similar to the right half of the clip 102 depicted in FIG. 6, having a base portion 104a somewhat more than half as long as the base 104, and a straight leg 108a having an outer end edge 112a. Leg 108a is attached to the base 104a by an outwardly curved joining section 118a. Outer edge 112a of clip 124 is secured to the inner end edge 71 of the odd vane (i.e., the rightmost vane 38 in FIG. 5) by an edge weld 122a, while the clip base 104a, which extends leftwardly from the odd vane, is secured to the leftwardly adjacent fastening member 82 by spot welds 120a.

It should be noted that while it is preferable to use the U-clips 102 to resiliently and releasably fasten alternating adjacent vane pairs to the inner shroud assembly 40 as just described, the half-clips 124 could be used to secure each vane to the shroud assembly 40, if desired.

The use of clips 102 and/or clips 124 as inner vane end connection members permits longitudinal thermal expansion and contraction of the vanes, and a limited amount of transverse vane movement relative to the shroud 70, such relative movements of the vanes causing flexure of the retention clips. This feature of the clip, in itself, represents a significant improvement over conventional vane-to-shroud attachment methods. However, the clips 102, 124 cooperate with the bendable, energy-absorbing vanes 38 in an even more important fashion when one or more of these vanes is struck by the engine-ingested object 36.

Damage-Limiting Response of Stator Vane Assembly 34 to Impact by Ingested Objects As is well known, the ingested object 36 is given a very large tangential velocity and force component, represented by the arrow 126 in FIGS. 2 and 8, by the rapidly spinning inlet fan 18. When the ingested object strikes one of the inlet stator vanes, this large tangential force (i.e., transverse to the vanes) is transmitted to the impacted vane.

In conventional stator vane assemblies, this severe vane impact can cause one or more of three types of vane assembly damage—any one of which can, in turn, cause an unacceptable reduction in engine power subsequent to the impact. First, one or more of the vanes can be shattered or torn loose, causing vane and/or shroud structure to be drawn through the core engine flow passage, damaging the core engine's many rotating components. Secondly, the impact can cause subsequent blockage of a substantial circumferential portion of the core flow passage entrance by outwardly deforming the inner support shroud and/or causing the deformed vane structure to pile up in front of the core passage entrance. Thirdly, because of the ingested object's high tangential velocity component, a large number of vanes can be damaged, thereby severely reducing the overall flow-straightening capability of the stator assembly.

Each of these three types of conventional stator assembly damage is eliminated or reduced to an acceptable level by the improved stator assembly 34 in a novel manner which will now be described with reference to FIGS. 8 and 9.

In contrast to the first form of impact damage often incurred by conventional stator vane assemblies, when the ingested object strikes one of the vanes 38 of the improved stator assembly 34 with a tangential force component 126 (which is directed leftwardly in FIG. 8) the struck vane does not shatter. Because of its bendable, energy-absorbing construction the vane is merely bent to the left.

Neither is the initially impacted vane 38 torn loose from the vane assembly 34. Instead, because the vane is releasably secured to the inner shroud assembly 40 with a radial retention strength substantially less than that at the outer shroud assembly 42, the vane is pulled outwardly through its inner shroud slot 96 (and the corresponding slot 98 in resilient strip 80) as it is being bent. The outer end of the initially impacted vane remains securely anchored at its outer end to the outer shroud assembly 42.

This impact-caused initial withdrawal of the vane 38 from its shroud slot 96 is, at first, yieldingly resisted by the retainer clip 102 that is edge-welded to the deforming vane. The ensuing deformation of the vane, and further withdrawal thereof from its shroud slot 96, moves the attached clip leg 108 radially outwardly, thereby deforming and reversing the curvature of the joining portion 118. This curvature reversal absorbs further kinetic energy from the ingested object and additionally causes the clip leg 108 to pivot away from the radially outwardly moving inner vane end portion 94 about the edge weld 122. The resulting bending stress imposed on the edge weld 122 breaks the weld joint, thus freeing the bent vane's inner end portion from the retaining clip leg 108. Such weld joint breakage may occur before the vane is pulled completely out of its inner shroud slot 96 (as indicated in FIG. 8), or after complete vane withdrawal (in which case the outer end of clip leg 108 is pulled outwardly through the slot 96 before the edge weld 122 is broken).

The freed vane is then driven, by the still-moving ingested object, into the immediately adjacent vane (i.e., the vane to the left of the bent vane in FIG. 8) which is still fully extended through its inner shroud slot 96 and edge-welded to the other leg 106 of the now partially deformed retainer clip 102. This further movement, and bending, of the freed vane causes it to bend at its fixed outer end connection to the outer shroud assembly 42 and pivot in a clockwise direction about its outer end bend as shown in FIG. 8.

When the first vane strikes the second vane, it does so with less impact force than that transmitted to the first vane by the ingested object because of the energy lost by the ingested object in bending the first vane, deforming the retaining clip portions 108, 118, and breaking the edge weld joint 122 (see FIG. 9). The second vane is bent to a lesser degree and moved transversely into the third vane with a still smaller force. During such bending and transverse movement of the second vane, it absorbs further energy from the ingested object, is pivoted in a clockwise direction, deforms its attached clip leg 106 and the joining portion 116 as previously described for clip portions 108, 118, and is freed from the inner shroud assembly 40 after breaking its inner end edge weld 121.

This process is repeated as to successive vanes until all of the ingested object's impact energy has been absorbed by the deformed vanes and their inner end retainer clips—a condition schematically represented in FIG. 9. It has been found in developing the stator vane assembly 34 that the unique cooperation between the energy-absorbing bendable vanes 38 and their deformable retainer clips 102 upon vane impact by an engine-ingested object functions to greatly limit the total circumferential extent of vane damage compared to previously employed stator assemblies utilizing deformable vanes. Typically, only a few of the vanes sustain damage. Because of this desirable feature of the present invention, the remaining flow-straightening capability of the vane assembly 34 subsequent to vane impact is quite high, and the ensuing engine power level is not unacceptably diminished.

While FIGS. 8 and 9 illustrate the use and function of the preferred U-clips 102, it should be noted that the L-clips 124 function in precisely the same manner, whether such half-clips are used for the "odd" vane in an uneven-numbered array of vanes, or are used to resiliently connect the inner ends of all the vanes to the inner shroud assembly.

Regarding the retainer clips, it should also be noted that the relative, spaced apart positioning of their spot welds 120, 120a and their edge welds 121, 122, and 122a assures that the retainer clips remain securely fastened to the inner shroud assembly 40 even after they are deformed and torn loose from their previously attached inner vane ends. This aspect of the present invention flows from the relatively large radius of curvature given to the joining portions 116, 118, 118a of the clips which assures that such joining portions are inwardly deformed by the outwardly withdrawn vanes, so that the edge welds are subjected to bending stress, and broken, while the spot welds on the retainer clip bases are loaded almost entirely in shear and remain intact. This, in turn, substantially eliminates the possibility that any of the retaining clips (which are initially positioned entirely out of the inlet air flow path) will be torn from the inner shroud assembly and drawn into the core flow passage 26.

Still another advantage is realized by utilizing the vane and retainer clip structure just described. Because the vane-to-shroud retention strength is considerably less at the inner ends of the vanes than at their outer ends, and because removal of the vanes from the inner shroud member is not substantially hindered by the shroud member itself, the described inner end withdrawal of a few of the vanes does not appreciably deform either of the shroud assemblies 40, 42 into the inlet passage and thereby cause blockage of one or both of the bypass and core flow passages 24, 26 as often occurs in conventional stator assemblies.

Moreover, neither do the damaged vanes themselves cause increased blockage of the core flow passage behind them. Instead, as shown in FIG. 9, the inner end portions of the freed vanes are automatically shifted radially away from the entrance to the core flow passage 26 and toward the entrance to the less critical bypass flow passage 24. It can also be seen in FIG. 9 that even if the damaged vanes retained only at their outer ends were subsequently torn loose from the outer shroud assembly 42, they would, in all likelihood, be merely forced out the bypass passage 24 and would not be drawn into the core flow passage 26.

In summary, the present invention provides improved stator vane assembly apparatus and methods which simultaneously eliminate or minimize the three major types of impact damage heretofore associated with conventional stator assemblies. The inner vane end retainer clips are quite inexpensive to produce and are quickly attachable to the stator assembly in the manner described, yet uniquely cooperate with the bendable, energy-absorbing stator vanes to afford the above-described advantages.

The foregoing detailed description is to be clearly understood as given by way of illustration and example only, the spirit and scope of this invention being limited solely by the appended claims.

What is claimed is:

1. A stator vane assembly comprising:
   (a) first support means;
   (b) second support means spaced from said first support means;
   (c) a bendable stator vane having first and second opposite side surfaces each having a width and extending lengthwise between said first and second support means, said stator vane further having an end portion adjacent said first support means, and an opposite end portion adjacent said second support means;
   (d) first connecting means for connecting said end portion of said stator vane to said first support means with a first vane retention strength; and
   (e) second connecting means for resiliently and releasably connecting said opposite end portion of said stator vane to said second support means with a second vane retention strength substantially less than said first vane retention strength in a manner such that if said vane is transversely bent to a sufficient degree said opposite end thereof will be detached from said second support means without causing substantial damage thereto, said second connecting means being the only means connecting said vane to said second support means and including:
      (1) a bendable retention member positioned adjacent said second support means, said retention member having a base portion extending along said second support means, a leg portion extending away from said second support means and lengthwise along said opposite end portion of said stator vane across only a relatively small portion of the width of said first side surface thereof, and a curved intermediate portion joining said base and leg portions, said intermediate portion having a relatively large radius of curvature,
      (2) first attachment means for securing said base portion to said second support means, and
      (3) second attachment means for securing said leg portion to said opposite end portion of said stator vane.

2. The stator vane assembly of claim 1 wherein said vane has a hollow, bendable body filled with a flexible, energy absorbing material.

3. The stator vane assembly of claim 2 wherein said flexible, energy absorbing material is an expanded foam material.

4. The stator vane assembly of claim 1 wherein said second support means are spaced inwardly from said first support means; said second connecting means further include an opening formed through said second support means, said vane extending through said opening so that said opposite end portion of said vane projects inwardly of said second support means, said opposite end portion of said vane being outwardly withdrawable through said opening; and said leg portion of said retention member projects inwardly from said second support means.

5. The stator vane assembly of claim 4 wherein said first attachment means comprise a weld joint formed between said base portion and said second support means; said leg portion and said opposite end portion of said vane have aligned end edges; and said second attachment means comprise a weld joint formed along said aligned end edges.

6. The stator vane assembly of claim 5 wherein said assembly further comprises an additional opening formed through said second support means; an additional bendable stator vane extending lengthwise between said first and second support means and through said additional opening so that an inner end portion of said additional vane projects inwardly of said second support means, said projecting inner end portion of said additional vane having an inner end edge and being outwardly withdrawable through said additional opening; and means for connecting an outer end portion of said additional vane to said first support means with said first vane retention strength, and wherein said retention member has an additional leg portion extending inwardly along said projecting inner end portion of said additional vane, across only a relatively small portion of the width of a side surface thereof, and interconnected to said base portion by an additional curved joining portion of said rentention member, said additional joining portion having a relatively large radius of curvature, said additional leg portion having an outer end edge aligned with an edge-welded to said inner end edge of said projecting inner end portion of said additional vane.

7. Stator vane apparatus comprising:
   (a) vane support means having an opening extending therethrough;
   (b) a stator vane extending through said opening and having an end portion projecting outwardly from said opening;
   (c) deformable retention means having mutually spaced first and second portions thereon respectively attachable to said support means and said projecting vane end portion, said first and second portions being joined by a curved third portion having a relatively large radius of curvature;

(d) first attachment means for securing said first retention means portion to said support means; and (e) second attachment means for securing said second retention means portion to said projecting vane end portion, said elements (c), (d) and (e) cooperating to yieldably and releasably restrain withdrawl of said projecting vane end portion through said opening by causing deformation and reverse curvature of said third portion of said retention means, and resulting bending stress on and breakage of said second attachment means, in response to withdrawl of said projecting vane end portion through said opening, while subjecting said first attachment means primarily to shear stress and leave the same intact.

8. The stator vane apparatus of claim 7 wherein said first and second portions of said retention means are relatively angled with said first portion extending generally transversely of said projecting vane end portion adjacent its juncture with said opening, and said second portion extending generally parallel to said projecting vane end portion and away from said support means.

9. The stator vane apparatus of claim 8 wherein said second portion of said retention means has an outer end edge, and said second attachment means include means for securing said outer end edge to said projecting vane end portion.

10. The stator vane apparatus of claim 9 wherein said projecting vane end portion has an end edge aligned with said outer end edge of said second portion of said retention means, and said second attachment means include means interconnecting the aligned end edges.

11. The stator vane apparatus of claim 10 wherein said means interconnecting the aligned end edges include a weld joint extending along said aligned end edges.

12. The stator vane apparatus of claim 11 wherein said first attachment means include a weld joint formed between said support means and said first portion of said retention means.

13. A stator vane assembly comprising:
(a) annular outer support means;
(b) annular inner support means coaxial with and positioned radially inwardly of said outer support means, said inner support means having a circumferentially spaced series of openings extending generally radially therethrough;
(c) a circumferentially spaced series of radially directed bendable stator vanes extending lengthwise from said outer support means through said openings so that inner end portions of said vanes project radially inwardly of said inner support means, said openings being configured to permit substantially unimpeded radially outward withdrawal therethrough of said projecting inner end portions of said vanes;
(d) first connecting means for essentially fixedly securing an outer end portion of each vane to said outer support means; and
(e) second connecting means, positioned radially inwardly of said inner support means, for resiliently and releasably connecting said projecting inner end portions of said vanes to said inner support means with a predetermined radial vane retention strength substantially less than that of said first connecting means.

14. The stator vane assembly of claim 13 wherein said second connecting means include a circumferentially spaced series of bendable clip members having relatively angled base and leg portions respectively secured to said inner support means and said inwardly projecting vane end portions.

15. The stator vane assembly of claim 14 wherein at least one of said clip members is generally U-shaped.

16. The stator vane assembly of claim 14 wherein at least one of said clip members is generally L-shaped.

17. The stator vane assembly of claim 14 wherein each of said leg portions of each clip member is interconnected to its associated base portion by a curved joining portion of such clip member, each of said joining portions having a relatively large radius of curvature.

18. The stator vane assembly of claim 14 wherein said inwardly projecting vane end portions have inner end edges, said clip member leg portions each have an outer end edge aligned with an inner end edge of an adjacent inwardly projecting vane end portion, and said leg portions are secured to said inwardly projecting vane end portions by weld joints extending along said aligned edges of said leg portions and said inwardly projecting vane end portions.

19. The stator vane assembly of claim 14 wherein said circumferentially spaced series of clip members are positioned between alternating adjacent pairs of said inwardly projecting vane end portions.

20. The stator vane assembly of claim 13 wherein said stator vanes have bendable, hollow bodies filled with flexible, energy-absorbing material.

21. The stator vane assembly of claim 20 wherein said flexible, energy-absorbing material is an expanded foam material.

22. An improved annular stator vane assembly for use in a turbofan jet engine or the like, comprising:
(a) an annular outer shroud member having a circumferentially spaced series of slots extending radially therethrough;
(b) an outer annular strip of resilient material wrapped outwardly around said outer shroud member and having a circumferentially spaced series of slots extending radially therethrough and aligned with said outer shroud member slots;
(c) an annular inner shroud member coaxial with and spaced radially inwardly of said outer shroud member, said inner shroud member having formed radially therethrough a circumferentially spaced series of slots;
(d) an inner annular strip of resilient material coaxially circumscribed by said inner shroud member and having formed radially therethrough a circumferentially spaced series of slots aligned with said inner shroud member slots;
(e) a circumferentially spaced series of fastening members positioned radially inwardly of said inner shroud member, secured to said inner shroud member, and retaining said inner resilient strip between said fastening members and said inner shroud member, said fastening members defining therebetween a circumferentially spaced series of gaps aligned with said slots in said inner resilient strip and said inner shroud member;
(f) a circumferentially spaced series of bendable stator vanes each extending lengthwise in a radial direction between said outer and inner shroud members, each of said vanes (1) extending through one of said gaps and an aligned pair of said slots in said inner shroud member and said inner resilient strip so that an inner end portion of the vane projects radially inwardly of said series of fastening members, said inner end portion being radially outwardly withdrawable through its associated gap and slots in response to a transverse bending of the vane, (2) extending through an aligned pair of said slots in said outer shroud member and said outer resilient strip, and (3) having a transversely enlarged base overlying said outer resilient strip and preventing withdrawal of the vane inwardly through its associated outer shroud member slot;

(g) an annular clamping band outwardly overlying the vane bases and holding them against said outer resilient strip; and (h) a circumferentially spaced series of bendable retention members each having a base portion secured to one of said fastening members, a leg portion projecting radially inwardly of said base portion and secured to one of said projecting inner vane end portions, and a curved joining portion interconnecting said leg and base portions of the retention member.

23. The stator vane assembly of claim 22 wherein said stator vanes have hollow, bendable bodies filled with a flexible, energy-absorbing material.

24. The stator vane assembly of claim 23 wherein said flexible, energy-absorbing material is an expanded foam material.

25. The stator vane assembly or claim 22 wherein said retention members are formed from elongated strips of sheet metal.

26. The stator vane assembly of claim 22 wherein said retention members are generally U-shaped, and are positioned between alternating adjacent pairs of said projecting inner end portions of said vanes, each of said retention members having a duality of leg portions each secured to a different projecting inner vane end portion in an adjacent pair thereof and interconnected to their associated base portion by curved joining portions of their retention member.

27. The stator vane assembly of claim 23 wherein at least one of said retention members is generally L-shaped.

28. The stator vane assembly of claim 22, 26 or 27 wherein said leg portions and their adjacent inner vane end portions have aligned end edges and are intersecured by weld joints extending along said aligned end edges.

29. The stator vane assembly of claim 28 wherein each of said joining portions has a relatively large radius of curvature.

30. The stator vane assembly of claim 28 wherein said base portions are spot welded to their adjacent fastening members.

31. A method of resiliently and releasably connecting a stator vane to vane support apparatus, comprising the steps of:

(a) forming through the support apparatus an opening configured to permit substantially unimpeded axial insertion and withdrawal therethrough of an end portion of the vane;

(b) positioning an axial portion of the vane within said opening so that said end portion of the vane projects outwardly through said opening;

(c) providing a retention member having relatively angled first and second portions interconnected by a bendable third portion;

(d) securing said first portion of said retention member to the vane support apparatus; and (e) securing said second portion of said retention member to said outwardly projecting end portion of the stator vane.

32. The method of claim 31 wherein said end portion of the vain has an end surface, said providing step (c) is performed by providing a retention member having an outer end edge on said second portion thereof, and said securing step (e) is performed by positioning said second portion so that it extends along said end portion of said vane, aligning said outer end edge of said second portion with said end surface of said vane, and intersecuring the aligned end edge and end surface.

33. The method of claim 32 wherein said providing step (c) is performed by providing a retention member formed from a strip of sheet metal, and said intersecuring step is performed by forming a weld joint along said aligned end edge and end surface.

34. The method of claim 31 wherein said providing step (c) is performed by providing a sheet metal retention member having a base portion, a leg portion extending generally transversely to said base portion, and a curved joining portion interconnecting said base and leg portions, said joining portion having a relatively large radius of curvature.

35. In a turbofan jet engine having an annular main inlet passage in which are sequentially positioned, in an upstream-to-downstream direction, an annular inlet fan, a stator vane assembly comprising coannular outer and inner support means with a circumferentially spaced series of stator vanes connected thereto and extending radially therebetween, and the entrances to coannular outer and inner bypass and core flow passages, a method of limiting stator assembly damage and ensuing engine power loss caused by engine-ingested objects which strike the stator assembly, said method comprising the steps of:

(a) utilizing in the stator vane assembly bendable stator vanes substantially longer than the radial distance between the outer and inner support means;

(b) forming a circumferentially spaced series of openings generally radially through the inner support means, said openings being larger than inner end portion cross-sectional areas of the vanes;

(c) positioning the vanes in said openings so that inner end portions of the vanes project inwardly of the inner support means; and (d) connecting said projecting vane end portions to the inner support means with bendable retention members each positioned inwardly of the inner support means, intersecured between the inner support means and at least on of said projecting vane end portions, and adapted to be deformed by and then detached from a vane end portion to which it is secured in response to outward movement of such vane end portion through its associated inner support means opening.

36. The method of claim 35 wherein said step (a) is performed by utilizing stator vanes having hollow, bendable bodies filled with a flexible, energy-absorbing material.

37. The method of claim 35 wherein said connecting step (d) includes providing generally U-shaped retention clips each having a duality of legs connected to opposite ends of a base portion by relatively large-radiused, curved joining portions, positioning said clips between alternate adjacent pairs of said projecting inner end portions of the vanes so that the base portion of each clip abuts the inner support means and the legs of the clip extend inwardly from the inner support means and along opposite inner vane end portions in an adjacent pair thereof, securing the clip bases to the inner support means, and securing the clip legs to their adjacent inner vane end portions.

38. The method of claim 35 wherein said connecting step (d) includes providing at least one generally L-shaped retention clip having a leg connected to a base by a relatively large-radiused, curved joining portion, positioning said clip so that said base abuts the inner support means and said leg extends inwardly from the inner support means and along one of said inner vane end portions, securing the clip base to the inner support means, and securing the clip leg to said one of said inner vane end portions.

39. The method of claim 37 or 38 wherein said securing steps are performed by welding.

40. The method of claim 39 wherein said clip legs are formed from sheet metal strips, said clip legs each have an outer end edge, and said inner vane end portions each have an inner end edge, said method further comprises the step of aligning the outer end edges of said clip legs with the inner end edges of their adjacent vane end portions, and said welding step includes forming weld joints along the aligned clip leg and vane edges.

* * * * *